(12) United States Patent
Wang et al.

(10) Patent No.: US 8,866,792 B2
(45) Date of Patent: Oct. 21, 2014

(54) METHOD FOR SCANNING PROJECTIVE CAPACITIVE TOUCH PANEL

(75) Inventors: Wanqiu Wang, Singapore (SG); Chun-Chi Lin, Yunlin County (TW)

(73) Assignees: TPK Touch Solutions (Xiamen) Inc., Xiamen (CN); TPK Touch Solutions Inc., Taipei (TW)

( * ) Notice: Subject to any disclaimer, the term of this patent is extended or adjusted under 35 U.S.C. 154(b) by 911 days.

(21) Appl. No.: 12/957,409

(22) Filed: Dec. 1, 2010

(65) Prior Publication Data

US 2011/0175847 A1      Jul. 21, 2011

(30) Foreign Application Priority Data

Jan. 21, 2010   (CN) .......................... 2010 1 0103958

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/0416* (2013.01)
USPC .......................... 345/174; 345/173; 178/18.06

(58) Field of Classification Search
USPC ................. 345/156–179; 178/18.01, 18.06
See application file for complete search history.

(56) References Cited

U.S. PATENT DOCUMENTS

| 2008/0158167 | A1 | 7/2008 | Hotelling et al. | |
|---|---|---|---|---|
| 2008/0158180 | A1 | 7/2008 | Krah et al. | |
| 2009/0009483 | A1 | 1/2009 | Hotelling et al. | |
| 2009/0066665 | A1 | 3/2009 | Lee | |
| 2009/0102802 | A1* | 4/2009 | Pietri et al. ..................... | 345/173 |
| 2010/0214232 | A1* | 8/2010 | Chan et al. ..................... | 345/173 |

* cited by examiner

*Primary Examiner* — William Boddie
*Assistant Examiner* — Mansour M Said
(74) *Attorney, Agent, or Firm* — Gokalp Bayramoglu

(57) ABSTRACT

The present invention relates to a method for scanning a projective capacitive touch panel. The method includes the following steps: scanning the mutual capacitance that are divided into at least two groups by applying different frequency excitation signals to different mutual capacitance groups, wherein a frequency of a excitation signal applied to a mutual capacitance group with greater RC constant is lower than that of a excitation signal applied to a mutual capacitance group with smaller RC constant; obtaining a first current voltage of each mutual capacitance; comparing the first current voltage with a first reference voltage to obtain candidate mutual capacitance whose first current voltage exceed the first reference voltage by a first threshold value; scanning the candidate mutual capacitance by applying a low frequency excitation signal; obtaining a second current voltage of each candidate mutual capacitance; comparing the second current voltage of each candidate mutual capacitance with a corresponding second reference voltage to obtain touched mutual capacitance whose second current voltage exceed the corresponding second reference voltage by a second threshold value.

18 Claims, 4 Drawing Sheets

METHOD FOR SCANNING PROJECTIVE CAPACITIVE TOUCH PANEL

BACKGROUND OF THE INVENTION

1. Field of the Invention

This application claims the benefit of People's Republic of China. Application No 201010103958.5, filed on Jan. 21, 2010.

The present invention generally relates to a method for scanning a projective capacitive touch panel.

2. Description of the Related Art

Capacitive touch panels are divided into projective capacitive touch panels and surface capacitive touch panels. Different touch panels adopt different principles according to different configurations. The projective capacitive touch panel is disposed on a substrate with the other surface of the projective capacitive touch panel attached to the substrate. A controller electrically connects to the projective capacitive touch panel for driving the projective capacitive touch panel.

The projective capacitive touch panel includes two layers of conductive electrodes orthogonally placed. One layer of conductive electrodes includes first-axis electrodes parallelly arranged along a first-axis (electrode X). The other layer of conductive electrodes includes second-axis electrodes parallelly arranged along a second-axis (electrode Y). The two layers of orthogonally placed and mutually insulated conductive electrodes form an electrode matrix having intersections. The controller includes a pulse generator connected to electrodes Y and an integrator connected to electrodes X.

Conventionally, mutual capacitance are scanned by first, having the pulse generator generate a continuous low frequency pulse excitation signal to charge electrodes Y then, the integrator collects electric charges induced in a plurality of electrodes X at the intersections between the electrodes Y and the electrodes X. According to the electric charges, the controller calculates reference voltages of capacitances at the above mentioned intersections. Then other electrodes Y are charged by the pulse generator one by one, and the reference voltages of the capacitances at all the intersections between the electrodes Y and the electrodes X are calculated by the above mentioned method.

When the touch panel is touched, all of the mutual capacitance, capacitance at the intersection of two electrodes (herein referred to as mutual capacitance), are scanned by applying a continuous low frequency pulse excitation signal to obtain current voltages (voltages occurring in the present time) of each mutual capacitance at each intersection by the method mentioned above, then each of the current voltages is compared with the corresponding reference voltage. If a current voltage exceeds the corresponding reference voltage by a threshold value at an intersection, then the intersection is considered located in a touched area, and a touched point will be determined by calculating the centroid of the intersections that are located in the touched area.

The conventional scanning method scans all the mutual capacitance by applying a constant frequency excitation signal, which will cause some problems. The distance from each mutual capacitance to the integrator varies, that is, the span of one sensing electrode from the integrator to a specific intersection may be, different from the span of another sensing electrode from the integrator to another specific intersection, which means the resistance of a specific length of sensing electrode from an intersection to the integrator may be different from that of another length of sensing electrode. Meanwhile, the capacitance at each intersection is basically the same, thus the RC constant (a product of a resistance and a capacitance) of each mutual capacitance may be different accordingly. The RC constant is smaller as the mutual capacitance is nearer to the integrator, and the RC constant is greater as the mutual capacitance is farther to the integrator. For a large size touch panel, the RC constant of the mutual capacitance formed at the first electrode Y is much different from the RC constant of the mutual capacitance formed at the last electrode Y. If all of the mutual capacitances are scanned by a constant relative high frequency excitation signal, the current voltage will be very different between the mutual capacitance having different RC constant, which will affect the scanning accuracy. In order to guarantee the scanning accuracy, the frequency of the excitation signal is lowered to reduce the difference, but low scanning frequency means low scanning, speed and long scanning time.

Thus, it is desired to provide a method for scanning a projective capacitive touch panel that overcomes the above drawbacks of the conventional scanning method.

SUMMARY OF THE INVENTION

A method for scanning a projective capacitive touch panel is provided including: scanning the mutual capacitance that are divided into at least two groups by applying different frequency excitation signals to different mutual capacitance groups, wherein a frequency of an excitation signal applied to a mutual capacitance group with greater RC constant is lower than that of an excitation signal applied to a mutual capacitance group with smaller RC constant; obtaining a first current voltage of each mutual capacitance; comparing the first current voltage with a first reference voltage to obtain a candidate mutual capacitance whose first current voltage exceeds the first reference voltage by a first threshold value; scanning the candidate mutual capacitance by applying a low frequency excitation signal, wherein the low frequency excitation signal is selected from the frequency excitation signals applied to obtain the first current voltage or any other low frequency excitation signal allowing the farthest end of the longest electrode being fully charged (hereinafter referred to as "low frequency excitation signal" or "low frequency"); obtaining a second current voltage of each candidate mutual capacitance; comparing the second current voltage of each candidate mutual capacitance with a corresponding second reference voltage to obtain touched mutual capacitance whose second current voltage exceed the corresponding second reference voltage by a second threshold value.

Thus, the method of the present invention uses different frequency excitation signals to scan different mutual capacitance groups according to the RC constant, which method can reduce the difference of the voltage between the mutual capacitance caused by the different RC constant and promote the scanning accuracy. Meanwhile, since the mutual capacitances which have lower RC constant are scanned by higher frequency excitation signal and mutual capacitance which have higher RC constant are scanned by lower frequency excitation signal, in determining current voltage of mutual capacitance, and only resulting candidate mutual capacitance are scanned by low frequency excitation signal, the scanning time can be significantly reduced, in other words, the scanning speed is much faster. Because of the above advantages, the method is especially suitable in scanning middle size or even large size projective capacitive touch panel.

BRIEF DESCRIPTION OF THE DRAWINGS

Skilled persons in the art will understand that the drawings, described below, are for illustration purposes only and do not

DETAILED DESCRIPTION OF THE INVENTION

In accordance with the usual meaning of "a" and "the" in patents, reference, for example to "an" electrode or "the" electrode is inclusive of one or more electrodes. In this application, the use of the singular includes the plural and vice versa unless specifically stated otherwise, for example, the term "mutual capacitance" includes singular and plural forms. The section headings used herein are for organizational purposes only, and are not to be construed as limiting the subject matter described.

The detailed description of the present invention will be discussed in the following embodiments, which are not intended to limit the scope of the present invention, but still can be adapted for other applications. While drawings are illustrated in details, it is appreciated that the quantity of the disclosed components could be greater or less than disclosed, except those components with express restricting amount.

Figure 3:
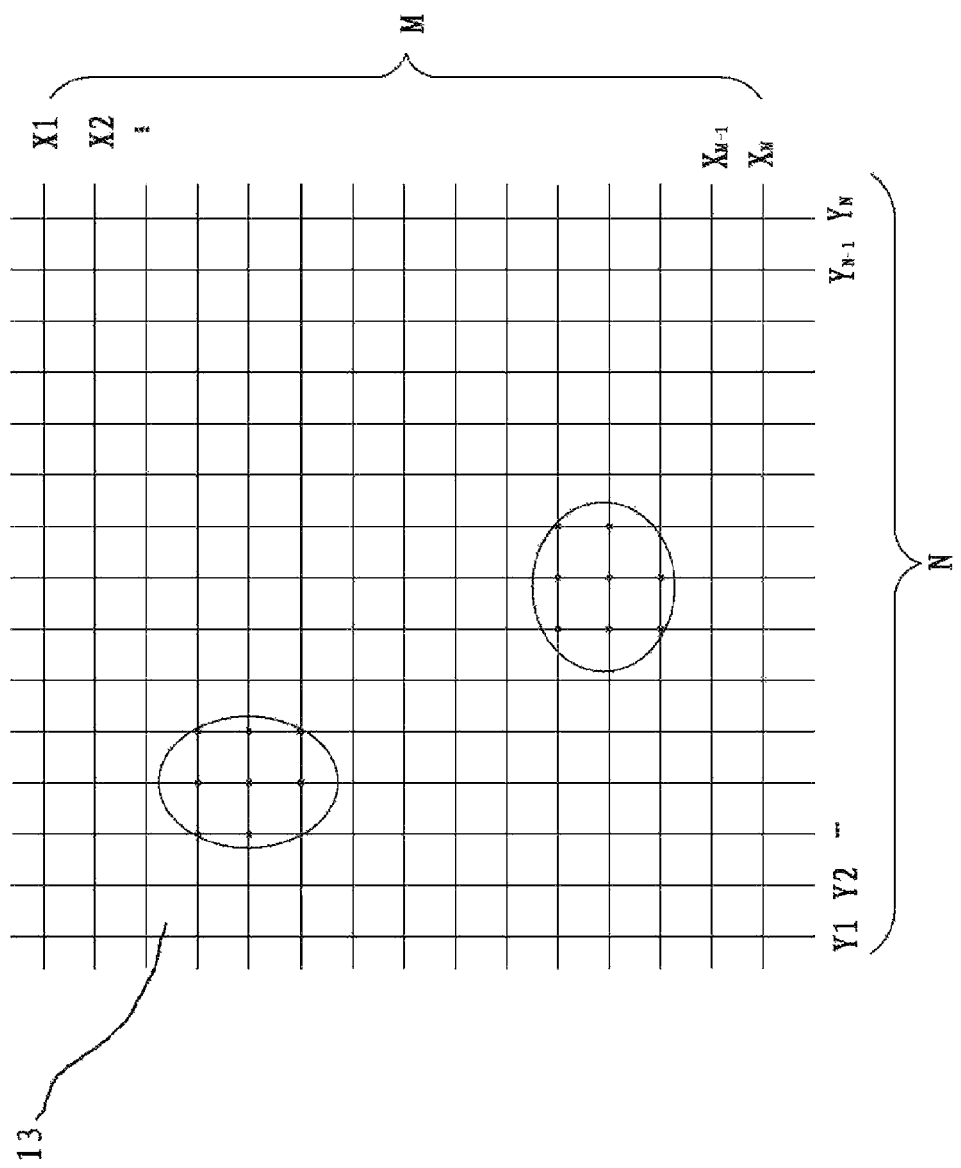
FIG. 3 illustrates a plan view of a projective capacitive touch panel being touched.

FIG. 3 is a top plan view of a projective capacitive touch panel according to an embodiment of the present invention. Touch panel 13 includes M(M≥1) sensing electrodes X parallelly arranged along a first axis and N(N≥1) driving electrodes Y parallelly arranged along a second axis. The driving electrodes Y and sensing electrodes X are orthogonally placed and mutually insulated, forming M×N mutual capacitance at the intersections between the driving electrodes Y and sensing electrodes X. Touched areas usually have a plurality of intersections located in the touched areas, as shown in FIG. 3. Generally, the electrodes are made of ITO (indium tin oxide) conductor. A controller (not shown) electrically connected to the touch panel 13 includes a pulse generator and an integrator wherein the pulse generator connects to one end of the driving electrodes Y and the integrator connects to one end of the sensing electrodes X.

Figure 4:
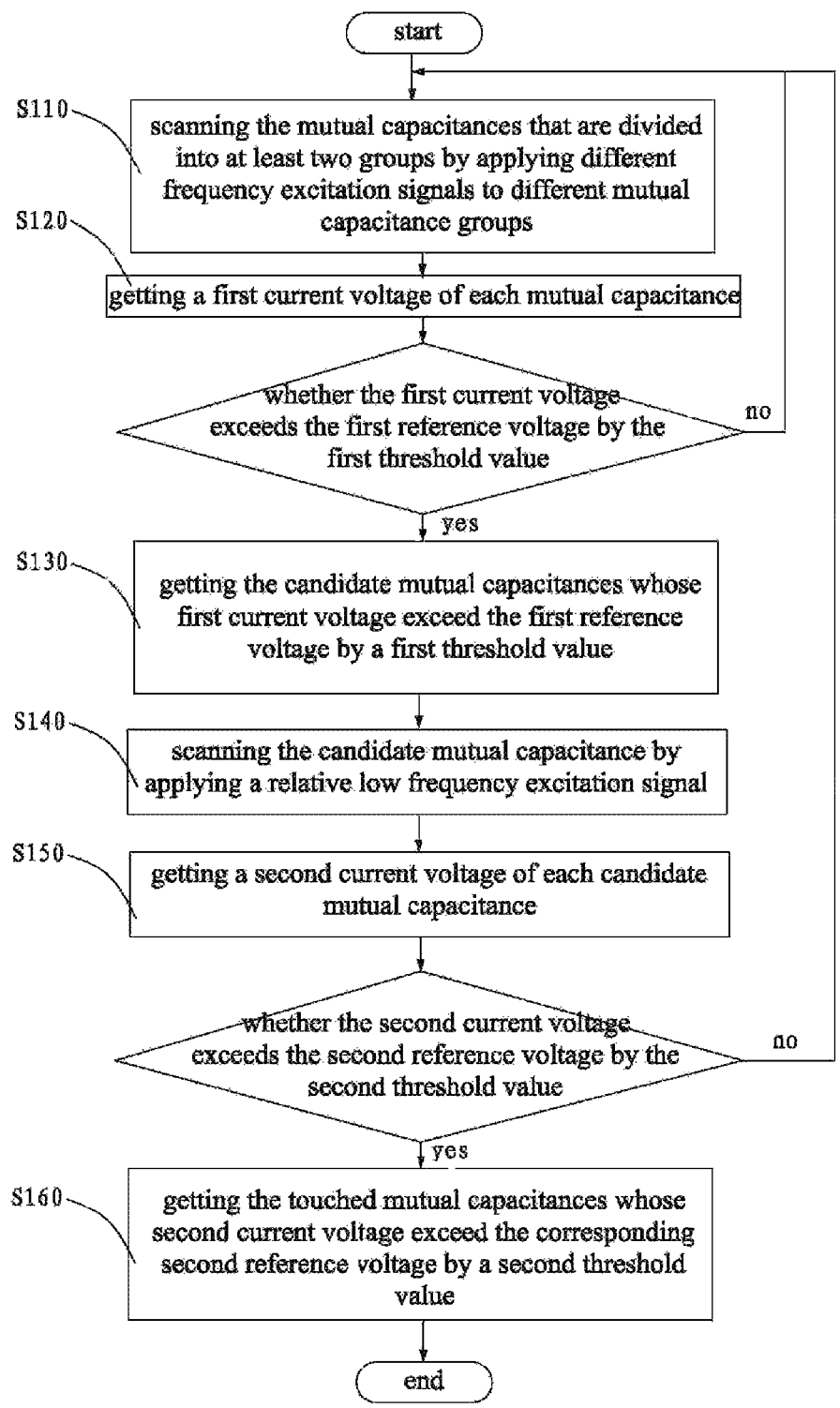
FIG. 4 is a flowchart of a method for scanning a projective capacitive according to the present invention.

The distance from the mutual capacitance in one driving electrodes to the integrator is different than that from the mutual capacitance in another driving electrodes to the same integrator. So the RC constant of the mutual capacitance in one driving electrodes is different than that from the mutual capacitance in another driving electrodes. A method of scanning a touch panel to speed up the scanning of present invention includes: dividing the touch panel into a plurality of regions, and then scanning the different regions by using excitation signals of different frequency respectively. FIG. 4 is a flowchart of a method for scanning a projective capacitive according to the present invention. The method includes the following steps:

In step 110: scanning the mutual capacitance that are divided into at least two groups by applying different frequency excitation signals to different mutual capacitance groups, wherein the frequency of an excitation signal applied to a mutual capacitance group with greater RC constant is lower than that of an excitation signal applied to a mutual capacitance group with smaller RC constant. While a capacitance is driven by an excitation signal, the excitation signal attenuates more as the frequency of the excitation signal increases if the RC constant keeps unchanged and the excitation signal also attenuates more as the RC constant of the capacitance increases if the frequency keeps unchanged. In order to maintain a stable voltage change and a high scanning speed as well the method applies different frequency excitation signals to different mutual capacitance groups.

In step 120 obtaining a first current voltage of each mutual capacitance. The first current voltage is used to record a current state of a mutual capacitance and to determine if the mutual capacitance may be touched in the following steps.

Step 130: comparing the first current voltage with a first reference voltage to obtain a candidate mutual capacitance whose first current voltage exceeds the first reference voltage by a first threshold value (herein referred to as "candidate mutual capacitance"). The first reference voltage means a generally normal state of the mutual capacitance, so a comparison between the first current voltage and the first reference voltage will tell if the mutual capacitance may be touched. Meanwhile, the voltage change may always exist, but some normal variation should be excluded, thus the first threshold value is used.

In step 140: scanning the candidate mutual capacitance by applying a low frequency excitation signal. After being sifted by the above steps, the number of mutual capacitance that may be touched, i.e., the candidate mutual capacitance, is reduced to a very small scale. Now by, applying a low frequency excitation signal to scan the candidate mutual capacitance, the scanning speed of the whole scanning period will not vary much while the scanning, accuracy is guaranteed.

In step 150: obtaining a second current voltage of each candidate mutual capacitance. The second current voltage is used to record a current state of a candidate mutual capacitance and to determine if the candidate mutual capacitance is touched in the following steps.

In step 160: comparing the second current voltage of each candidate mutual capacitance with a corresponding second reference voltage to obtain touched mutual capacitance whose second current voltage exceed the corresponding second reference voltage by a second threshold value (herein referred to as "touched mutual capacitance". The second reference voltage means a generally normal state of the candidate mutual capacitance, so a comparison between the second current voltage and the second reference voltage will tell if the candidate mutual capacitance is really touched.

In one embodiment, the width of one electrode is generally half the size of a finger, so when the touch panel is touched there are at least one sensing electrode X and one driving electrode Y being touched. Generally, there are two or three sensing electrodes X and driving electrodes Y being touched, and the voltage change caused by such touch can be detected. The method scans the whole touch panel once in a period from time to time until the touch panel is touched. As FIG. 4 shows, the method should determine whether the first current voltage exceeds the first reference voltage by the first threshold value, and whether the second current voltage exceeds the second reference voltage by the second threshold value. According to different result, different processes are proceeded. If there is no mutual capacitance whose first current voltage exceeds the first reference voltage by the first threshold value, or if there is no mutual capacitance whose second current voltage exceeds the second reference voltage by the second threshold value, the method repeats scanning all the mutual capacitance.

The method further includes: calculating centroids of intersections where the touched mutual capacitance are formed after the touched mutual capacitance are determined. This step determines a touch point for a touched area where the touched mutual capacitance are grouped. The centroid of the various intersections where the touched mutual capacitance are formed need to be taken into account by employing the following formulas: $X=(X1*U1+X2*U2+X3*U3+\ldots Xn*Un)/(U1+U2+U3+\ldots Un)$, $Y=(Y1*U1+Y2*U2+Y3*U3+\ldots Yn*Un)/(U1+U2+U3+\ldots Un)$, n=the number of touched, mutual capacitance and is of positive integers. Assume that there are 4 touched mutual capacitance at 4 intersections which have coordinates (Xa,Ya), (Xb,Yb), (Xc,Yc) and (Xd,Yd) in a touched area, and the corresponding induced voltages are Ua, Ub, Uc and Ud. Thus, the centroid (X,Y) of the touched area is calculated by the following formulas:

$$X=(Xa*Ua+Xb*Ub+Xc*Uc+Xd*Ud)/(Ua+Ub+Uc+Ud),$$

$$Y=(Ya*Ua+Yb*Ub+Yc*Uc+Yd*Ud)/(Ua+Ub+Uc+Ud).$$

Figure 1:
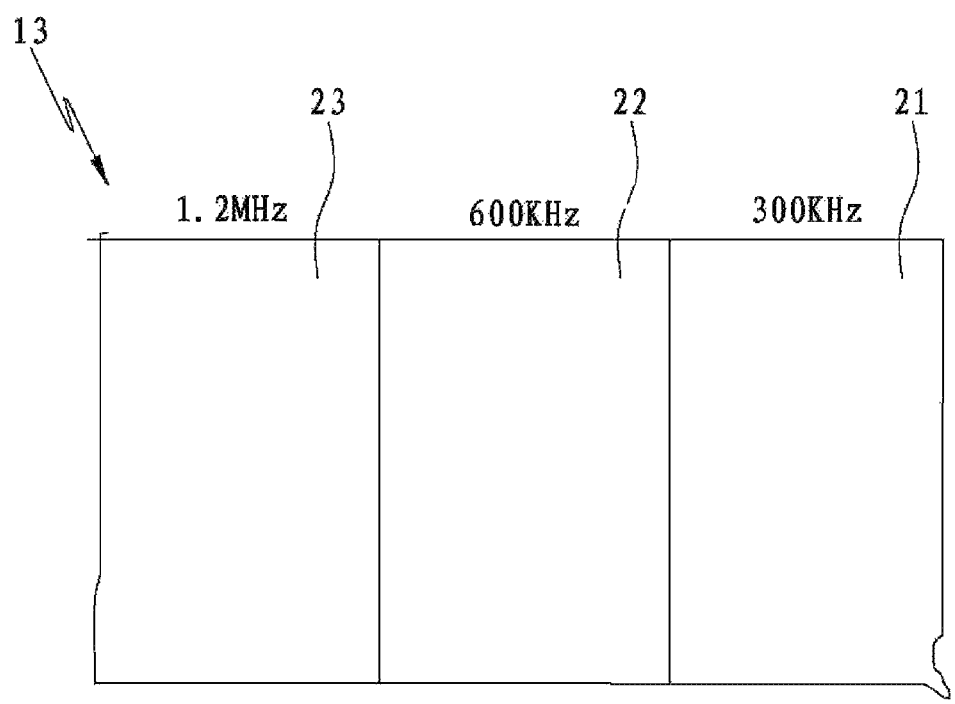
FIG. 1 shows how the mutual capacitance groups are assigned different frequency excitation signals.

All the mutual capacitance are divided into at least two groups according to the RC constant to the integrator. For a middle size touch screen, the number of groups can be small, but for a large size touch screen which has a big number of mutual capacitance, all the mutual capacitance are divided into at least two groups. The mutual capacitance may be equally divided or unequally divided: in the way of equally dividing, all the mutual capacitance are separated by axes along the second axis to form groups having a same number of mutual capacitance; in the way of unequally dividing, all the mutual capacitance are separated by axes along the second axis to form groups having different number of mutual capacitance. Referring to FIG. 1, in one embodiment, all the mutual capacitance in the projective capacitive touch panel 13 are divided into three groups. The three groups include a first group 21 having a high RC constant, a third group 23 having a low RC constant, and a second group 22 having a middle RC constant.

The first reference voltage for each group can be set by the following steps: excitation signals with different frequency are applied to each group to obtain a first initial voltage of each mutual capacitance, that is, higher frequency excitation signals are applied to the capacitance groups whose RC constant is lower, lower frequency excitation signals are applied to the capacitance groups whose RC constant is higher. In one embodiment, the mutual capacitance in the first group 21 are scanned by a 300 KHz excitation signal, the mutual capacitance in the second group 22 are scanned by a 600 KHz excitation signal and the mutual capacitance in the third group 23 are scanned by a 1.2 MHz excitation signal. Then an average value of all the first initial voltages in each group is calculated, the average value is considered as the first reference voltage of each corresponding group. For example, the average value of all the first initial voltages in the first group 21 is considered as the first reference voltage of the first group 21, the average value of all the first initial voltages in the second group 22 is considered as the first reference voltage of the second group 22, and the average value of all the first initial voltages in the third group 23 is considered as the first reference voltage of the third group 23. In order to obtain a more stable and accurate first reference voltage, the controller scans all the mutual capacitance multiple times to obtain a plurality of first initial voltages of each mutual capacitance, then calculates the average voltage of a plurality of first initial voltages of each mutual capacitance, take the average value of the average voltage of a plurality of first initial voltages as the first reference voltage of each corresponding group.

One method to scan all the mutual capacitance in the first group 21 is firstly to apply a 300 KHz excitation signal to charge the driving electrodes Y which are the one third (from the ⅔ nth to the nth electrode assuming that n is the total number of the driving electrodes Y) driving electrodes Y farthest to the integrator, secondly to collect the electric charges induced in, the sensing electrodes X at the intersections between the driving electrodes Y and the sensing electrodes X and then to convert the electric charges to the first initial voltage. The other two groups of mutual capacitance can be scanned by the same method but only applying different frequency excitation signals, i.e., applying a 600 KHz excitation signal to the second group 22 and a 1.2 MHz excitation signal to the third group 23.

Figure 2:
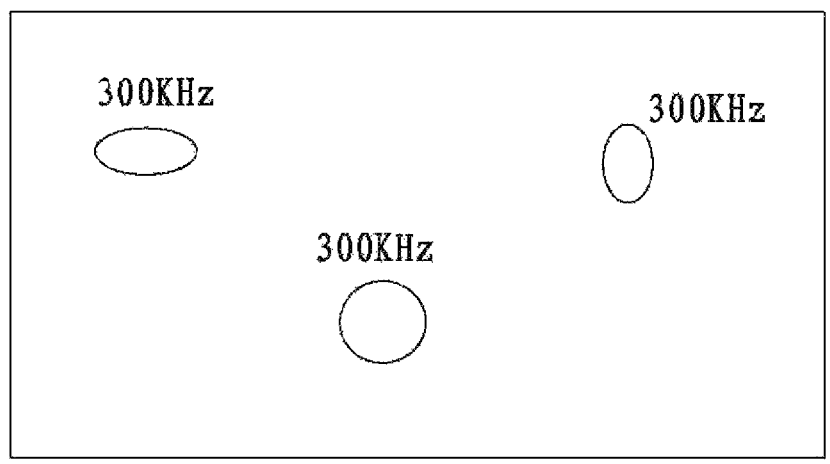
FIG. 2 illustrates that all the mutual capacitance are scanned by a same frequency excitation signal while setting the second reference voltage.

FIG. 2 illustrates that all the candidate mutual capacitance are scanned by a same frequency excitation signal while setting the second reference voltage. Setting the second reference voltage for each candidate mutual capacitance includes: a low frequency excitation signal is applied to all the candidate mutual capacitance and a second initial voltage of each candidate mutual capacitance is derived, in one embodiment, the excitation signal is a 300 KHz signal. The second initial voltage is considered as the second reference voltage of each corresponding candidate mutual capacitance. In order to obtain a more stable and, accurate second reference voltage, the controller scans all the candidate mutual capacitance multiple times to obtain a plurality of second initial voltage of each candidate mutual capacitance, then calculates an average voltage of a plurality of second initial voltage of each candidate mutual capacitance, then the average value, of the average voltage of a plurality of second initial voltage is considered as the second reference voltage of each corresponding group.

One method to scan all the candidate mutual capacitance is firstly to apply a 300 KHz excitation signal to charge all the driving electrodes Y, secondly to collect the electric charges induced in the sensing electrodes X at the intersections between the driving electrodes Y and the sensing electrodes X and then to convert the electric charges to a second initial voltage.

All the mutual capacitance are scanned by applying higher frequency excitation signals to the capacitance groups whose RC constant is lower and applying lower frequency excitation signals to the capacitance groups whose RC constant is higher. Then obtain the first current voltage of each mutual capacitance, compare each of the first current voltage with, the first reference voltage to obtain the candidate mutual capacitance whose first current voltage exceed the first reference voltage by the first threshold value. In one embodiment, the mutual capacitance in the first group 21 are scanned by a 300 KHz excitation signal, the mutual capacitance in the second group 22 are scanned by a 600 KHz excitation signal and the mutual capacitance in the third group 23 are scanned by a 1.2 MHz excitation signal The voltage change of a mutual capacitance may be caused by a touch or insufficient charge to the driving electrode Y while applying high frequency excitation signal to the mutual capacitance, so the mutual capacitance whose first current voltages exceed the first reference voltage by the first threshold value are considered as candidate mutual capacitance and may not be the touched mutual capacitance. The candidate mutual capacitance should be further analyzed to determine the touched mutual capacitance. Since the number of candidate mutual capacitance is far less than the total number, scanning the candidate mutual capacitance by applying a low frequency can guarantee the scanning accuracy and will not affect the scanning speed very much.

All the candidate mutual capacitance are scanned by applying a low frequency excitation signal to the driving electrodes Y. Firstly a 300 KHz excitation signal is applied to charge all the driving electrodes Y pass through the candidate mutual capacitance, secondly the electric charges induced in the sensing electrodes X at the intersections between the driving electrodes Y and the sensing electrodes X are collected and then the electric charges are converted to a second current voltage. The candidate mutual capacitance whose second current voltages exceed the corresponding second reference voltage by the second threshold value are the touched mutual capacitance. Thus, the candidate mutual capacitance that are charged insufficiently can be excluded by setting the second threshold value.

Take a projective capacitive touch screen with the size of 57×42 (57 driving electrodes and 42 sensing electrodes) as an example, three kinds of excitation signals respectively having frequency 300 KHz, 600 KHz and 1.2 MHz are applied to scan the touch panel, resulting the following test data:

|  | 1.2 MHz | 600 KHz | 300 KHz |
| --- | --- | --- | --- |
| The 1st driving electrode | 116 mv | 292 mv | 348 mv |
| The 57th driving electrode | 0 mv | 68 mv | 240 mv | wherein the voltage values in the table are obtained by applying corresponding excitation signal to designate driving electrode. The voltage decent is 31%, 76.7% and 100% while applying 300 KHz, 600 KHz and 1.2 MHz excitation signal respectively, so a lower frequency excitation signal will provide a more stable and accurate voltage change.

In one embodiment of the present invention, the method divides all the mutual capacitance to three groups, and applies different frequency excitation signals to different groups according to the RC constant of the mutual capacitance in each group, so the voltages will be close in different groups, which means the voltage changes are stable. Since the number of candidate mutual capacitance is far less than the total number, scanning the candidate mutual capacitance by applying a low frequency can guarantee the scanning, accuracy and will not affect the scanning speed very much. The total scanning time of the method of the embodiment according to the present invention reduces to ⅓ of the time using the conventional scanning method by applying a constant 300 KHz excitation signal.

While certain embodiments have been shown and described, various modifications and substitutions may be made thereto without departing from the spirit and scope of the invention. Accordingly, it is to be understood that the present invention has been described by way of illustration and not limitations.

What is claimed is:

1. A method of scanning a touch panel, comprising:
    dividing the touch panel into a plurality of regions. comprising:
        dividing mutual capacitance formed by driving electrodes and sensing electrodes of the touch panel into a plurality of groups with each group having a plurality of mutual capacitance located in the corresponding region;
    scanning the different regions by using excitation signals of different frequency respectively;
    obtaining candidate mutual capacitance whose capacitance changes after being scanned by excitation signals, comprising:
        obtaining a first current voltage of each mutual capacitance:
        comparing the first current voltage with a first reference voltage; and
        obtaining the candidate mutual capacitance whose first current voltage exceed the first reference voltage by a first threshold value; and
    scanning the candidate mutual capacitance by using excitation signals of low frequency to obtain touched mutual capacitance, comprising:
        obtaining a second current voltage of each candidate mutual capacitance;
        comparing the second current voltage of each candidate mutual capacitance with a corresponding second reference voltage; and
    obtaining touched mutual capacitance whose second current voltage exceed the corresponding second reference voltage by a second threshold value.

2. The method according to claim 1, wherein the frequency of the excitation signal applied to the region with greater RC constant is lower than that of an excitation signal applied to the region with smaller RC constant.

3. The method according to claim 1, wherein if there is no mutual capacitance whose first current voltage exceeds the first reference voltage by the first threshold value, the procedure proceeds back to claim 1 of scanning all the mutual capacitance.

4. The method according to claim 1, wherein if there is no mutual capacitance whose second current voltage exceeds the second reference voltage by the second threshold value, the procedure proceeds back to claim 1 of scanning all the mutual capacitance.

5. The method according to claim 1, further comprising:
    calculating a centroid of intersections of where the touched mutual capacitance are determined.

6. The method according to claim 5, wherein the centroid of the intersections of touched mutual capacitance are calculated by employing the following formulas:

$$X=(X1*U1+X21*U2+X3*U3+Xn*Un)/(U1+U2 1+U3+\ldots Un),$$

$$Y=(Y1*U1+Y2*U2+Y3*U3+\ldots Yn*Un)/(U1+U2+U3+\ldots Un)$$

n=the number of touched mutual capacitance and is of positive integers.

7. The method according to claim 1, wherein all the mutual capacitance are equally divided into at least two groups.

8. The method according to claim 1, wherein all the mutual capacitance are unequally divided into at least two groups.

9. The method according to claim 1, wherein the first reference voltage and the second reference voltage are preset according to empirical values.

10. The method according to claim 1, wherein the first reference voltage of each group is set by the following steps: applying the same excitation signals to each corresponding group to obtain a first initial voltage of each mutual capacitance; calculating an average value of all the first initial voltages in each group; and taking the average value as the first reference voltage of the corresponding group.

11. The method according to claim 1, wherein the first reference voltage of each group is set by the following steps:

applying same excitation signals to each corresponding group multiple times to obtain a plurality of first initial voltages of each mutual capacitance; calculating an average voltage of a plurality of first initial voltages of each mutual capacitance; calculating an average value of all the average voltages of the mutual capacitance in each group; and taking the average value as the first reference voltage of each corresponding group.

12. The method according to claim 11, wherein a plurality of first initial voltages are derived by the following steps: applying the excitation signal to each of the driving electrodes in the corresponding group multiple times; collecting the electric charges induced in the sensing electrodes and convert the electric charges to one first initial voltage each tune the driving, electrode being driven by the excitation signal.

13. The method according to claim 1, wherein the second reference voltage of each mutual capacitance is set by the following steps: applying a low frequency excitation signal to the candidate mutual capacitance and obtaining a second initial voltage of each candidate mutual capacitance; and taking the second initial voltage as the second reference voltage of each candidate mutual capacitance.

14. The method according to claim 1, wherein the second reference voltage of each candidate mutual capacitance is set by the following steps: applying a low frequency excitation signal to the candidate mutual capacitance multiple times and obtaining a plurality of second initial voltages of each candidate mutual capacitance; calculating an average value of a plurality of second initial voltages of each candidate mutual capacitance; and taking the average value as the second reference voltage of each candidate mutual capacitance.

15. The method according to claim 14, wherein a plurality of second initial voltages are derived by the following steps; applying the low frequency excitation signal to each of the driving electrodes multiple times; collecting the electric charges induced in the sensing electrodes and convert the electric charges to one second initial voltage each time the driving electrode being driven by the low frequency excitation signal.

16. The method according to claim 1, wherein obtaining a first current voltage of each mutual capacitance comprises: applying a excitation signal to the driving electrode of each mutual capacitance; collecting electric charges induced in the sensing electrodes and convert the electric charges to the first current voltage of each mutual capacitance.

17. The method according to claim 1, wherein obtaining a second current voltage of each candidate mutual capacitance comprises: applying the low frequency excitation signal to the driving electrode of each candidate mutual capacitance; collecting the electric charges induced in the sensing electrodes and convert, the electric charges to a second current voltage of each candidate mutual capacitance.

18. The method according to claim 1, wherein the mutual capacitance are equally divided into three groups with the frequency of the excitation signals applied to each group to obtain the first current voltages being set at 300 KHz, 600 KHz and 1.2 MHz according to the RC constant from high to low; and with the frequency of the excitation signals applied to the resulting candidate mutual capacitance to obtain the second current voltages being set at 300 KHz.

* * * * *